P. FORCHHEIMER.
TANK OF LARGE DIAMETER.
APPLICATION FILED JUNE 8, 1909.
1,014,054.
Patented Jan. 9, 1912.
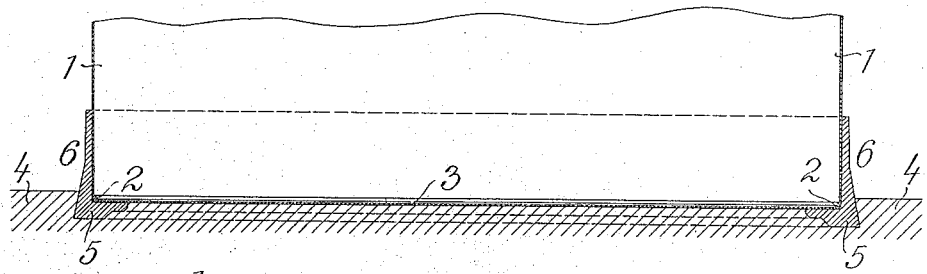
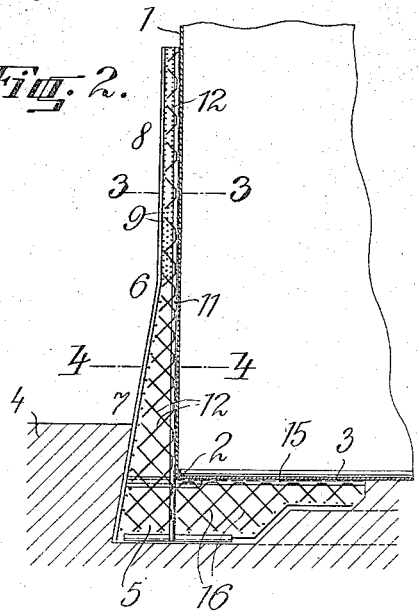
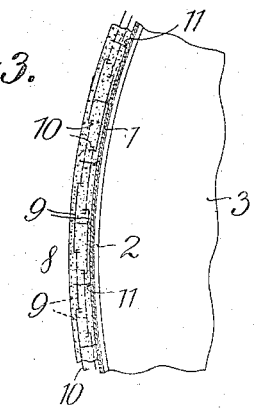
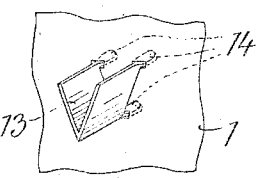
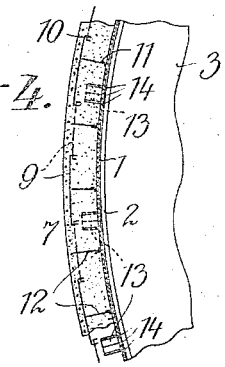
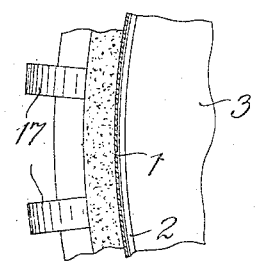
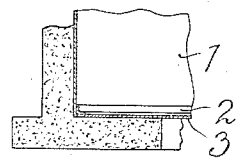
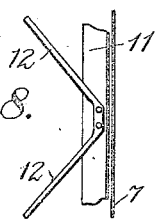
Witnesses:
John Lotka
John A. Kellenbeck
Inventor:
Philipp Forchheimer
by Attorney.

UNITED STATES PATENT OFFICE.

PHILIPP FORCHHEIMER, OF GRATZ, AUSTRIA-HUNGARY, ASSIGNOR TO THE FIRM OF BERLIN-ANHALTISCHE MASCHINENBAU-ACTIEN-GESELLSCHAFT, OF BERLIN, GERMANY.

TANK OF LARGE DIAMETER.

1,014,054.      Specification of Letters Patent.      Patented Jan. 9, 1912.

Application filed June 8, 1909. Serial No. 500,947.

*To all whom it may concern:*

Be it known that I, PHILIPP FORCHHEIMER, a citizen of the Empire of Austria-Hungary, and residing at Gratz, Duchy of Styria, Austria-Hungary, have invented certain new and useful Improvements in Tanks of Large Diameter, of which the following is a specification.

This invention relates to tanks of large diameter, more particularly those intended for liquids or fluids. Hitherto the walls of such tanks have been formed of comparatively thick sheet metal to prevent changes in the form of the tank in consequence of the severe strains caused by the pressure of the fluid. For this reason the use of large tanks having sheet iron walls is limited, seeing that after a certain thickness the sheet iron plates cannot satisfactorily be joined and riveted.

The object of this invention is to reduce the thickness of the walls by the particular formation of the lower part of such tanks, thereby enabling the construction of tanks of very large diameter to be readily accomplished.

According to this invention, the outer cylindrical wall of the tank bears against the vertical portion of a ferro-concrete ring of angular cross-section, the floor of the tank being in contact with the horizontal portion of the ring which thus serves as a foundation or support for an annular part thereof, the strain exerted by the fluid upon this horizontal member being equal to or greater than the pressure exerted upon the vertical portion of the angular ring. The ferro-concrete ring, in combination with the lower edge of the tank which bears against it, may be regarded as one body formed of angular levers placed beside each other in a circle and connected together. Since the pressure of the fluid in a horizontal or outward direction tends to turn each angle lever outward about the vertex, and the vertical or downward pressure of the fluid acts in opposition to this turning movement, the horizontal arms of the angle levers are made of such dimensions that the resultant of the force acting upon them and of the outward force acting upon the vertical arms, passes through the vertex of the angle or through the horizontal arm. An outward tilting of the angle lever is thus prevented. In this construction of tank the sheet iron walls may be of less thickness, seeing that in the horizontal direction they have only to take up a fraction of the pressure of the fluid, whereas they resist vertical moments of resistance in combination with the ring of ferro-concrete in contact with them, the consequence being that there are practically only tensile strains in the vertical direction in the sheet iron walls, even in the event of any deflection occurring.

The tank according to this invention has the advantage that no separate foundation is required, seeing that the horizontal portion of the angle ring surrounding the lower portion of the sheet iron walls is embedded in the bottom of the tank, and serves at the same time as a foundation.

In the accompanying drawings which show a construction of gas-holder tank according to this invention, Figure 1 is a vertical longitudinal section through the lower portion of the tank, Fig. 2 is a vertical section of the bottom part on a larger scale, Fig. 3 is a section on line 3—3 of Fig. 2, Fig. 4 is a section on line 4—4 of Fig. 2, Fig. 5 is a perspective view of a member for connecting the sheet iron walls to the angle ring of ferro-concrete, Fig. 6 shows the edge portion of another form of tank or holder in vertical section, Fig. 7 is a horizontal section of the lower part of another modified construction of gas-holder tank and Fig. 8 is an enlarged detail vertical section of a portion of the tank shown in Fig. 2.

In the tank shown in Fig. 1 which may be, by way of example, 74 meters in diameter and about 13 meters high, the cylindrical wall 1 is composed of sheets which increase in thickness toward the bottom, and sheets of less thickness are joined to these sheets at the lower portion of the wall. The lower sheets of the wall 1 are rigidly connected to the sheet iron bottom 3 of the tank by means of comparatively light angle iron rings 2. This tank made of sheet iron is inserted into an angle ring of ferro-concrete. The horizontal part 5 of this ring having the form of a rigid body is embedded in the floor 4 and rigidly connected to the vertical part 6 of the ring by means of a suitable joint. The vertical portion 6 of the angle ring is likewise, up to a certain height, in the form of a rigid body 7 of ferro-concrete, while its upper part 8 consists of concrete, which is simply reinforced by layers or strips of iron to take up any annular tensile strain that may arise in this portion. These inner strips of iron comprise individual ring segments 9, the ends 10 of which are bent, and which, without further fastening means, are placed horizontally into the mass of concrete in such a manner that they partly overlap each other, as may be seen in Fig. 3. Similar iron strips are preferably also provided in the lower ring portion 7, and in the horizontal ring portion 5.

The sheet iron wall 1 is connected with the vertical part 6 of the iron concrete ring by vertical projections extending into the mass of concrete and comprising angle irons 11, secured at certain intervals to the outer circumference of the wall 1 so as to be parallel, or nearly parallel, with the axis of the tank, and also round-edged iron members 12 or the like, arranged crosswise, preferably in the lower ring portion 7, and suitably connected to the angle irons 11. The projections extending into the concrete of the vertical portion 6 of the angular ring prevent the displacement of the wall relatively to the portion 6 in the event of its expanding owing to the pressure of the fluid, the inner layers of iron 9 taking up the annular tensile strains which arise, while the round-edged irons 12, placed cross-wise, and the angle irons 11 intimately connect the concrete body with the wall 1 to such an extent that they conjointly take up the bending strain in the radial planes.

To insure a safe connection between the wall 1 and the concrete ring, additional angle members are preferably secured between the angle irons 11 to the wall 1, the points of which are directed downward, as may be seen in Fig. 5. These angle pieces, when embedded in the concrete, resist deflection, and, owing to their special arrangement, prevent the formation of hollow spaces as the concrete is being rammed down.

The angle members 13 are preferably of V-cross-section and provided with arms 14 at their inner ends whereby they are safely fastened to the wall 1. These arms pass through corresponding holes in the wall 1, and their projecting ends are riveted over.

It is preferable to secure upon the under side of the sheet iron bottom 3 of the tank, radial angle irons 15 extending to the outer circumference of the angle ring, round-edged irons 16 again being fixed to the latter, projecting into the concrete of the horizontal portion 5 of the ring, which, conjointly with the bottom sheet, take up the tensile strains in part 5. The foot of the angle ring of concrete 5, 6 may also be T-shaped, as is shown in Fig. 6 of the drawings if desired and further, the horizontal portion 5 may be provided on its outer surface at certain intervals with projections 17, which may be formed as buttresses, as shown in Fig. 7.

I claim as my invention:

1. In a tank of relatively large diameter, the combination of an upright sheet metal wall and a horizontal base, of a ferro-concrete angle ring having a vertical arm closely embracing the lower portion of the upright wall, and a horizontal arm connected with and arranged to support the peripheral portion of the base, and a foundation into which said angle ring extends, said foundation being in engagement with the vertical and horizontal arms of said ring.

2. In a tank of relatively large diameter the combination with an upright sheet metal wall and horizontal base, of a ferro-concrete angle ring having a vertical arm closely embracing the lower portion of the vertical wall and a horizontal arm arranged to support the peripheral portion of the base and vertical projections of substantially V-shape extending from said vertical wall into the vertical portion of the ferro-concrete ring, the said V-shaped projections having their points directed downwardly.

3. In a tank of relatively large diameter, the combination with an upright sheet metal wall and horizontal base, of a ferro-concrete angle ring having a vertical arm closely embracing the lower portion of the wall and a horizontal arm arranged to support the peripheral portion of the base, V-shaped angle members extending from said upright wall into the vertical portion of the ferro-concrete ring and arms carried by said V-shaped members and connected to the said sheet metal wall.

In testimony whereof I hereunto affix my signature in the presence of two witnesses.

PHILIPP FORCHHEIMER.

Witnesses:
ROBERT W. HEINGARTNER,
AUGUST FUGGER.